US012749435B2

(12) United States Patent
Kim et al.

(10) Patent No.: US 12,749,435 B2
(45) Date of Patent: Sep. 29, 2026

(54) OPTICAL COMPENSATION DEVICE, DISPLAY DEVICE, METHOD OF OPTICALLY COMPENSATING DISPLAY DEVICE, AND ELECTRONIC APPARATUS INCLUDING DISPLAY DEVICE

(71) Applicant: Samsung Display Co., LTD., Yongin-si (KR)

(72) Inventors: Donglim Kim, Yongin-si (KR); Kiyoung Kim, Yongin-si (KR); Eunhye Kim, Yongin-si (KR); Seongjun Lee, Yongin-si (KR); Sola Lee, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 19/010,627

(22) Filed: Jan. 6, 2025

(65) Prior Publication Data

US 2025/0322782 A1 Oct. 16, 2025

(30) Foreign Application Priority Data

Apr. 12, 2024 (KR) ........................ 10-2024-0049161

(51) Int. Cl.
*G09G 3/32* (2016.01)
*G09G 3/20* (2006.01)
(Continued)

(52) U.S. Cl.
CPC ................. *G09G 3/32* (2013.01); *G09G 3/20* (2013.01); *G09G 3/2007* (2013.01);
(Continued)

(58) Field of Classification Search
CPC ....... G09G 2320/0646; G09G 2360/16; G09G 3/3426; G09G 2320/0276;
(Continued)

(56) References Cited

U.S. PATENT DOCUMENTS 10,733,932 B2 * 8/2020 Pyo ...................... G09G 3/2044
12,223,871 B2 * 2/2025 Lee ...................... G09G 3/3233
(Continued)

FOREIGN PATENT DOCUMENTS

KR 1020210074447 A 6/2021

*Primary Examiner* — Dismery Mercedes
(74) *Attorney, Agent, or Firm* — CANTOR COLBURN LLP

(57) ABSTRACT

An optical compensation device includes an optical measurer which measures a first transmission luminance of a transmission area of a display device when a light source of an optical sensor, which overlaps the transmission area, does not emit light, a second transmission luminance of the transmission area when the light source emits light, and a neighboring (adjacent) luminance of a neighboring (adjacent) area neighboring the transmission area, and a gamma determiner which determines a first transmission reference gamma voltage for the transmission area so that a difference between the first transmission luminance and the neighboring (adjacent) luminance is within a reference range, and determines a second transmission reference gamma voltage
(Continued)

for the transmission area so that a difference between the second transmission luminance and the neighboring (adjacent) luminance is within the reference range.

21 Claims, 15 Drawing Sheets

(51) Int. Cl.
*G09G 3/34* (2006.01)
*G09G 3/36* (2006.01)

(52) U.S. Cl.
CPC ......... *G09G 3/3426* (2013.01); *G09G 3/3611* (2013.01); *G09G 2310/0275* (2013.01); *G09G 2310/08* (2013.01); *G09G 2320/0233* (2013.01); *G09G 2320/0242* (2013.01); *G09G 2320/0276* (2013.01); *G09G 2320/0626* (2013.01); *G09G 2320/0673* (2013.01); *G09G 2320/0686* (2013.01); *G09G 2360/14* (2013.01)

(58) Field of Classification Search
CPC ... G09G 2320/0233; G09G 2320/0673; G09G 2300/0819; G09G 2320/0626; G09G 2360/14; G09G 2320/0242; G09G 2310/0275; G09G 2320/0686; G09G 3/20; G09G 3/2003
See application file for complete search history.

(56) References Cited

U.S. PATENT DOCUMENTS

| | | | | |
|---|---|---|---|---|
| 2021/0049947 | A1* | 2/2021 | Tian | G09G 3/3225 |
| 2022/0036827 | A1* | 2/2022 | Lin | G09G 3/3266 |
| 2022/0139336 | A1* | 5/2022 | Jeon | G09G 3/3208 345/694 |
| 2022/0277701 | A1* | 9/2022 | Monomoshi | G09G 3/3611 |
| 2023/0119029 | A1* | 4/2023 | Oh | G09G 3/3233 345/204 |
| 2023/0214058 | A1* | 7/2023 | Kallio | G06F 3/0421 345/175 |
| 2023/0335059 | A1* | 10/2023 | Mi | G09G 3/3233 |
| 2024/0094765 | A1* | 3/2024 | Leclerc | G06F 1/1686 |
| 2024/0257758 | A1* | 8/2024 | Jang | G09G 3/3258 |

* cited by examiner

OPTICAL COMPENSATION DEVICE, DISPLAY DEVICE, METHOD OF OPTICALLY COMPENSATING DISPLAY DEVICE, AND ELECTRONIC APPARATUS INCLUDING DISPLAY DEVICE

This application claims priority to Korean Patent Application No. 10-2024-0049161, filed on Apr. 12, 2024, and all the benefits accruing therefrom under 35 U.S.C. § 119, the content of which in its entirety is herein incorporated by reference.

BACKGROUND

1. Field

Embodiments relate to an optical compensation device. More particularly, embodiments relate to an optical compensation device for a display device, a display device optically compensated by an optical compensation device, a method of optically compensating a display device, and an electronic apparatus including a display device.

2. Description of the Related Art

A deviation may occur between a luminance of an image that a display device intends to display and a luminance of an image actually displayed by the display device. Accordingly, a multi-time programming ("MTP") to repeatedly compensate/correct optical characteristics (or gamma characteristics) of the display device may be performed during or after a manufacturing process of the display device.

Further, a luminance deviation may occur between areas of the display device. When the display device includes a transmission area that transmits external light and a non-transmission area that does not transmit external light, a luminance deviation may occur between the transmission area and the non-transmission area, and a multi-time programming for the transmission area to repeatedly compensate/correct optical characteristics (or gamma characteristics) of the transmission area may be performed.

SUMMARY

Embodiments provide an optical compensation device that improves a display quality of a display device.

Embodiments provide a display device with an improved display quality and an electronic apparatus including the display device.

Embodiments provide a method of optically compensating a display device for improving a display quality of the display device.

An optical compensation device in an embodiment may include an optical measurer which measures a first transmission luminance of a transmission area of a display device when a light source of an optical sensor, which overlaps the transmission area, does not emit light, a second transmission luminance of the transmission area when the light source emits light, and a neighboring (adjacent) luminance of a neighboring (adjacent) area neighboring the transmission area, and a gamma determiner which determines a first transmission reference gamma voltage for the transmission area so that a difference between the first transmission luminance and the neighboring (adjacent) luminance is within a reference range, and determines a second transmission reference gamma voltage for the transmission area so that a difference between the second transmission luminance and the neighboring (adjacent) luminance is within the reference range.

In an embodiment, an emission period of the light source may be within an emission period of a pixel disposed in the transmission area.

In an embodiment, an emission period of the light source may be synchronized with a driving signal of the display device.

In an embodiment, the emission period of the light source may be synchronized with a vertical synchronization signal of the display device.

In an embodiment, the emission period of the light source may be synchronized with an emission start signal of the display device.

In an embodiment, when the transmission area corresponds to an $n^{th}$ pixel row (n is a natural number greater than or equal to 1) to an $m^{th}$ pixel row (m is a natural number greater than n), the emission period of the light source may be synchronized with an $m^{th}$ emission signal applied to the $m^{th}$ pixel row.

In an embodiment, the emission period of the light source may be between a falling edge of the $m^{th}$ emission signal and a rising edge of an $n^{th}$ emission signal applied to the nth pixel row.

In an embodiment, the optical measurer may measure a normal luminance of a normal area of the display device which is a non-transmission area, and the gamma determiner may determine a normal reference gamma voltage for the normal area so that a difference between the normal luminance and a target luminance is within the reference range.

In an embodiment, the optical sensor may include at least one of a face recognition sensor and a three-dimensional sensor.

A display device in embodiments may include a display panel including a normal area which is a non-transmission area and a transmission area, an optical sensor overlapping the transmission area and including a light source, a gamma voltage generator which generates a first transmission gamma voltage based on a first transmission reference gamma voltage for the transmission area determined so that a difference between a first transmission luminance of the transmission area when the light source does not emit light and a neighboring (adjacent) luminance of a neighboring (adjacent) area neighboring the transmission area is within a reference range, and generates a second transmission gamma voltage based on a second transmission reference gamma voltage for the transmission area determined so that a difference between a second transmission luminance of the transmission area when the light source emits light and the neighboring (adjacent) luminance is within the reference range, and a data driver which converts image data for the transmission area into a data voltage for the transmission area based on the first transmission gamma voltage and the second transmission gamma voltage, and applies the data voltage for the transmission area to the transmission area.

In an embodiment, an emission period of the light source may be within an emission period of a pixel disposed in the transmission area.

In an embodiment, the display device may further include an emission driver which generates a plurality of emission signals applied to a plurality of pixel rows of the display panel based on an emission start signal, and a controller which receives a vertical synchronization signal, and generates the image data and the emission start signal.

In an embodiment, an emission period of the light source may be synchronized with the vertical synchronization signal.

In an embodiment, an emission period of the light source may be synchronized with the emission start signal.

In an embodiment, when the transmission area corresponds to an $n^{th}$ (n is a natural number greater than or equal to 1) pixel row to an $m^{th}$ (m is a natural number greater than n) pixel row, an emission period of the light source may be synchronized with an $m^{th}$ emission signal applied to the $m^{th}$ pixel row.

In an embodiment, the emission period of the light source may be between a falling edge of the $m^{th}$ emission signal and a rising edge of an $n^{th}$ emission signal applied to the nth pixel row.

In an embodiment, the data driver may convert the image data for the transmission area into the data voltage for the transmission area based on the first transmission gamma voltage when the light source does not emit light, and may convert the image data for the transmission area into the data voltage for the transmission area based on the second transmission gamma voltage when the light source emits light.

In an embodiment, the gamma voltage generator may generate a normal gamma voltage based on a normal reference gamma voltage for the normal area determined so that a difference between a normal luminance of the normal area and a target luminance is within the reference range. The data driver may convert the image data for the normal area into the data voltage for the normal area based on the normal gamma voltage, and may apply the data voltage for the normal area to the normal area.

In an embodiment, the optical sensor may include at least one of a face recognition sensor and a three-dimensional sensor.

A method of optically compensating a display device in embodiments may include measuring a first transmission luminance of a transmission area of a display device when a light source of an optical sensor, which overlaps the transmission area, does not emit light, determining a first transmission reference gamma voltage for the transmission area so that a difference between the first transmission luminance and a neighboring (adjacent) luminance of a neighboring (adjacent) area neighboring the transmission area is within a reference range, measuring a second transmission luminance of the transmission area when the light source emits light, and determining a second transmission reference gamma voltage for the transmission area so that a difference between the second transmission luminance and the neighboring (adjacent) luminance is within the reference range.

In an embodiment, measuring the first transmission luminance or measuring the second transmission luminance may include measuring the neighboring (adjacent) luminance.

In an embodiment, the method may further include measuring a normal luminance of a normal area of the display device which is a non-transmission area, and determining a normal reference gamma voltage for the normal area so that a difference between the normal luminance and a target luminance is within the reference range.

In an electronic apparatus including a display device which displays an image and a host processor which provides image data to the display device in embodiments, the display device may include a display panel including a normal area which is a non-transmission area and a transmission area, an optical sensor overlapping the transmission area and including a light source, a gamma voltage generator which generates a first transmission gamma voltage based on a first transmission reference gamma voltage for the transmission area determined so that a difference between a first transmission luminance of the transmission area when the light source does not emit light and a neighboring (adjacent) luminance of a neighboring (adjacent) area neighboring the transmission area is within a reference range, and generates a second transmission gamma voltage based on a second transmission reference gamma voltage for the transmission area determined so that a difference between a second transmission luminance of the transmission area when the light source emits light and the neighboring (adjacent) luminance is within the reference range, and a data driver which converts the image data for the transmission area into a data voltage for the transmission area based on the first transmission gamma voltage and the second transmission gamma voltage, and applies the data voltage for the transmission area to the transmission area.

In the optical compensation device, the display device, the method of optically compensating the display device, and the electronic apparatus in the embodiments, the first transmission reference gamma voltage for the transmission area may be determined so that a difference between the first transmission luminance of the transmission area when the light source of the optical sensor does not emit light and the neighboring (adjacent) luminance of the neighboring (adjacent) area is within the reference range, and the second transmission reference gamma voltage for the transmission area may be determined so that a difference between the second transmission luminance of the transmission area when the light source emits light and the neighboring (adjacent) luminance is within the reference range, and thus, optical compensation for the transmission area may be accurately performed by considering whether the light source of the optical sensor emits light. Accordingly, a contrast between the normal area and the transmission area may decrease, and the display quality of the display device may be improved.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
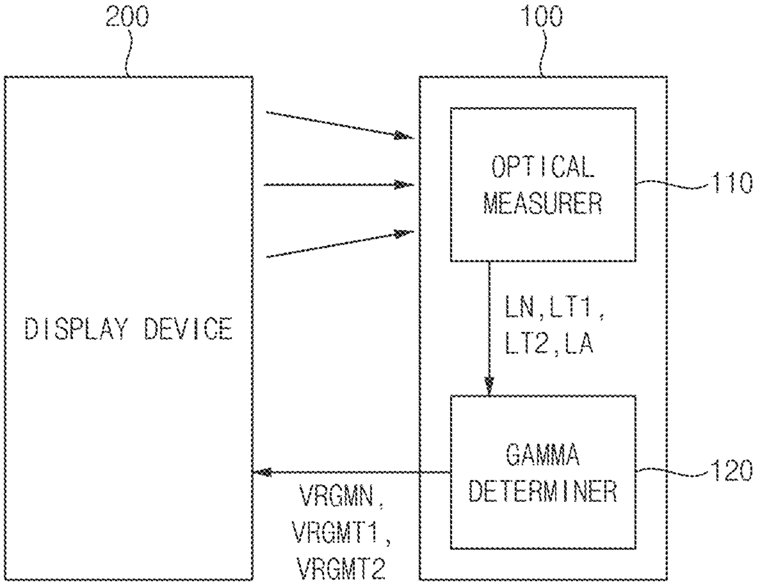
FIG. 1 is a block diagram showing an embodiment of an optical compensation device.

Hereinafter, an optical compensation device, a display device, a method of optically compensating a display device, and an electronic apparatus in embodiments of the disclosure will be described in more detail with reference to the accompanying drawings. The same or similar reference numerals will be used for the same elements in the accompanying drawings.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
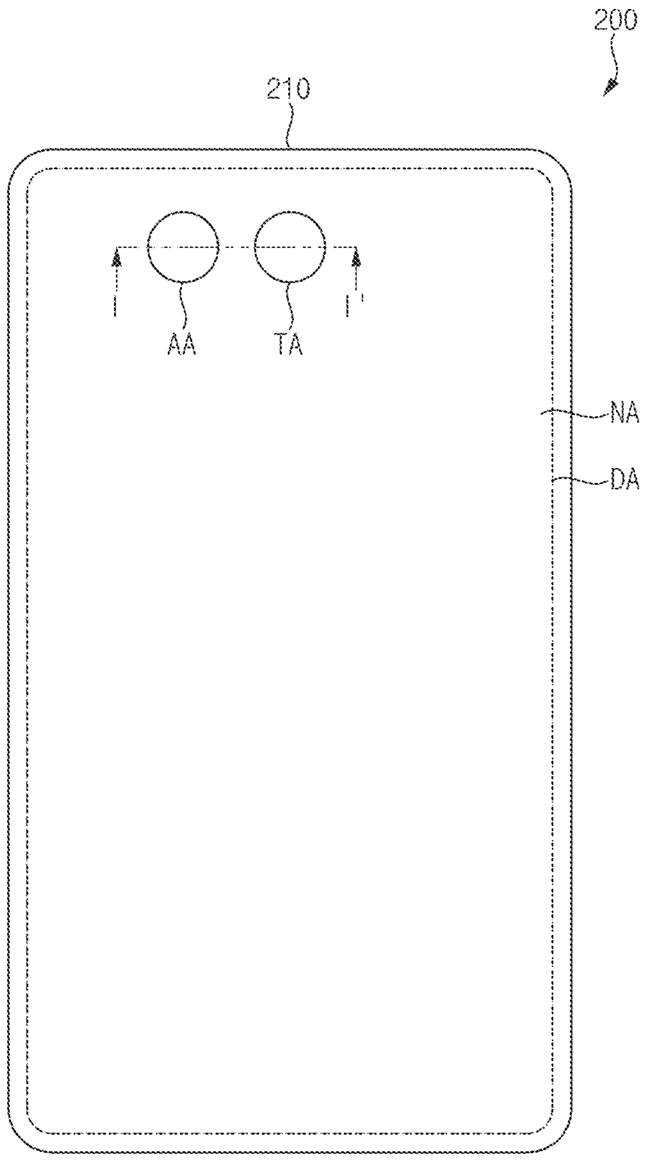
FIG. 2 is a plan view showing a display device of FIG. 1.
Figure 3:
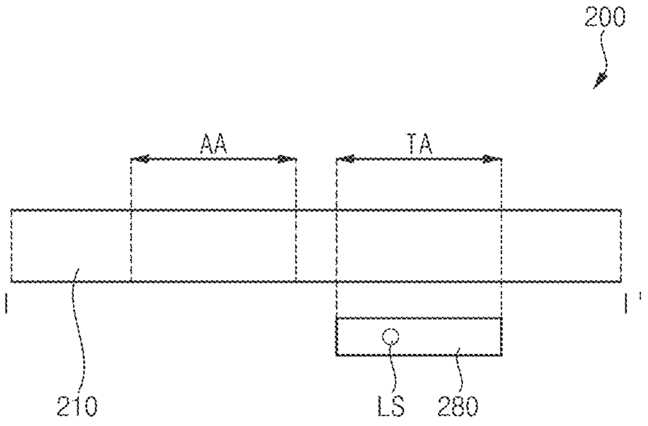
FIG. 3 is a cross-sectional view taken along line I-I' of FIG. 2.
Figure 4:
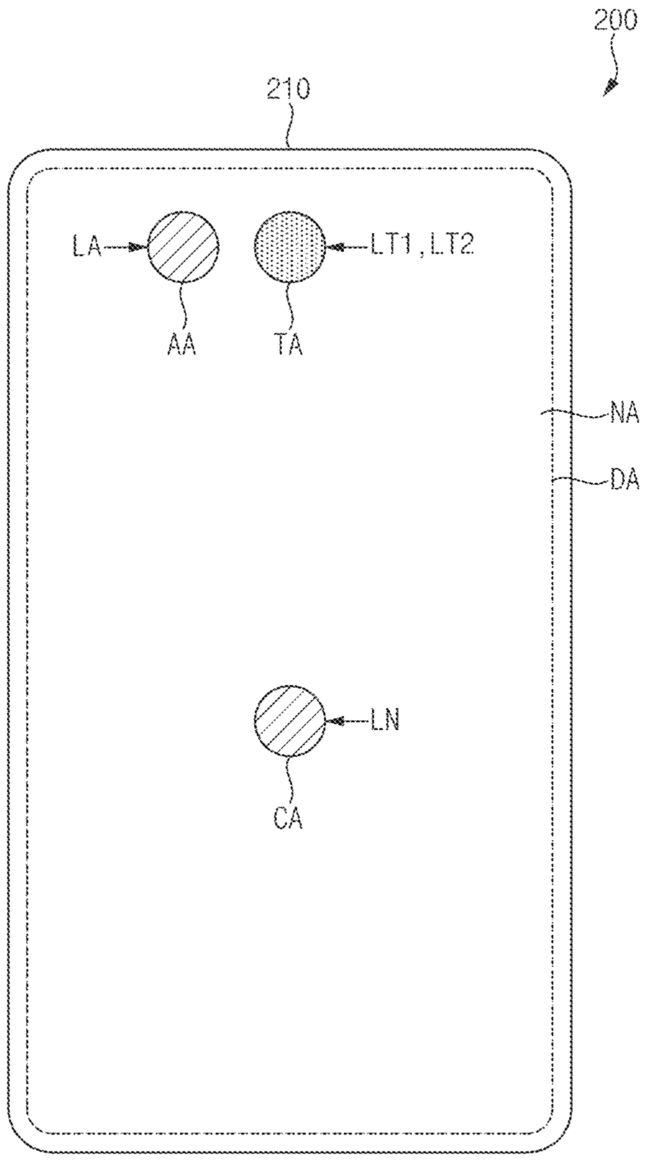
FIG. 4 is a view for describing capturing an image of a display device using the optical compensation device of FIG. 1.
Figure 5:
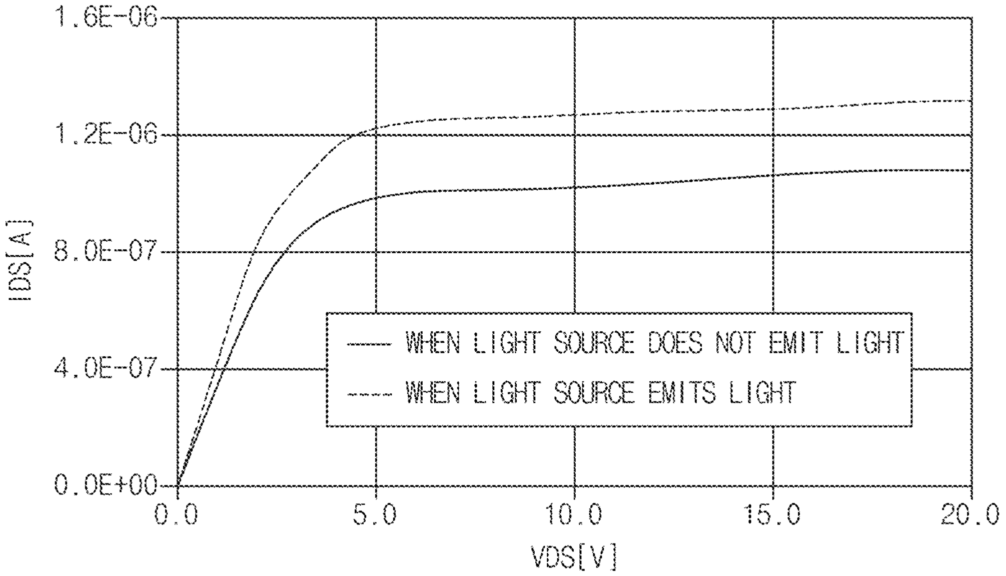
FIG. 5 is a graph showing a driving current according to whether a light source of an optical sensor emits light.
Figure 6:
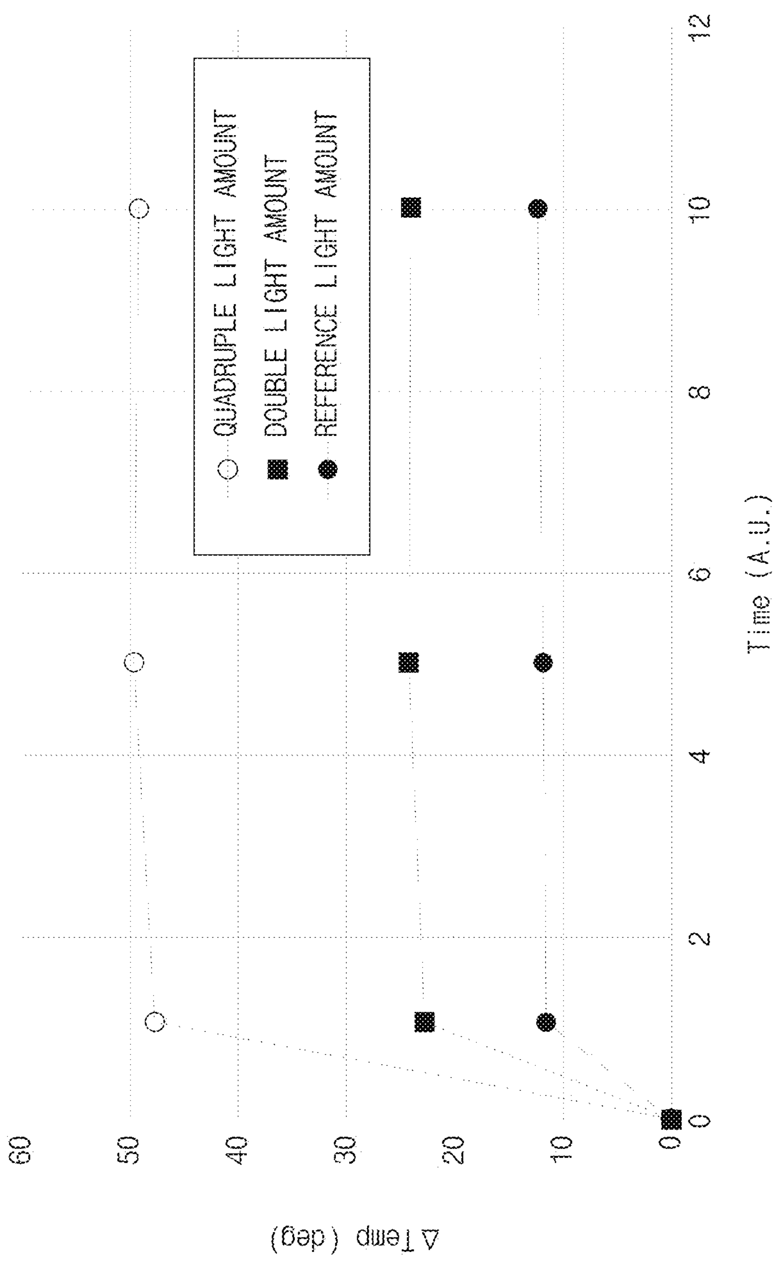
FIG. 6 is a graph showing a temperature of a transmission area according to an emission of the light source of the optical sensor.

FIG. 1 is a block diagram showing an embodiment of an optical compensation device 100. FIG. 2 is a plan view showing a display device 200 of FIG. 1. FIG. 3 is a cross-sectional view taken along line I-I' of FIG. 2. FIG. 4 is a view for describing capturing an image of the display device 200 using the optical compensation device 100 of FIG. 1. FIG. 5 is a graph showing a driving current IDS according to whether a light source (refer to LS of FIG. 3, for example) of an optical sensor 280 emits light. FIG. 6 is a graph showing a temperature of a transmission area TA according to an emission of the light source of the optical sensor 280.

Referring to FIGS. 1 to 6, an optical compensation device 100 may measure a normal luminance LN of a normal area (also referred to as a non-transmitting display area) NA of the display device 200, a first transmission luminance LT1 of a transmission area TA of the display device 200 when a light source of an optical sensor 280 does not emit light, a second transmission luminance LT2 of the transmission area TA of the display device 200 when the light source of the optical sensor 280 emits light, and a neighboring (adjacent) luminance LA of a neighboring (adjacent) area AA of the display device 200, and may determine normal reference gamma voltages VRGMN for the normal area NA, first transmission reference gamma voltages VRGMT1 for the transmission area TA, and second transmission reference gamma voltages VRGMT2 for the transmission area TA. The optical compensation device 100 may determine the normal reference gamma voltages VRGMN for the normal area NA by comparing the normal luminance LN of the normal area NA with a target luminance. The optical compensation device 100 may determine the first transmission reference gamma voltages VRGMT1 for the transmission area TA by comparing the first transmission luminance LT1 of the transmission area TA with the neighboring (adjacent) luminance LA of the neighboring (adjacent) area AA. The optical compensation device 100 may determine the second transmission reference gamma voltages VRGMT2 for the transmission area TA by comparing the second transmission luminance LT2 of the transmission area TA with the neighboring (adjacent) luminance LA of the neighboring (adjacent) area AA.

The optical compensation device 100 may include an optical measurer 110 and a gamma determiner 120.

The optical measurer 110 may measure the normal luminance LN of the normal area NA of the display device 200. The normal area NA may be an area excluding the transmission area TA among a display area DA of the display device 200. The normal area NA may be an area that displays an image and does not transmit external light. The normal area NA may be a non-transmission area.

In an embodiment, the optical measurer 110 may measure the normal luminance LN by capturing an image of a central area CA of the normal area NA of the display device 200. The optical measurer 110 may measure the first transmission luminance LT1 and the second transmission luminance LT2 of the transmission area TA of the display device 200, and the neighboring (adjacent) luminance LA of the neighboring (adjacent) area AA of the display device 200. The transmission area TA may be an area that displays an image and transmits external light. In an embodiment, the transmission area TA may be also referred to as an under panel camera ("UPC") area or an under panel sensor ("UPS") area, for example. The neighboring (adjacent) area AA may be neighboring the transmission area TA, and may be included in the normal area NA. The neighboring (adjacent) area AA may be an area that displays an image and does not transmit external light.

The optical measurer 110 may measure the first transmission luminance LT1 by capturing the transmission area TA when the light source of the optical sensor 280 does not emit light, and may measure the second transmission luminance LT2 by capturing the transmission area TA when the light source of the optical sensor 280 emits light. In an embodiment, the optical measurer 110 may measure the neighboring (adjacent) luminance LA by capturing the neighboring (adjacent) area AA of the display device 200 when the light source of the optical sensor 280 does not emit light and/or when the light source of the optical sensor 280 emits light.

Since the normal area NA is an area that does not transmit external light and the transmission area TA is an area that transmits external light, although the normal area NA and the transmission area TA display an image having the same grayscale, a luminance of the normal area NA and a luminance of the transmission area TA may be different. In this case, a contrast between the normal area NA and the transmission area TA may increase, and the transmission area TA may be recognized. To reduce the contrast between the normal area NA and the transmission area TA, the optical compensation device 100 may determine transmission reference gamma voltages for the transmission area TA by comparing a transmission luminance of the transmission area TA with the neighboring (adjacent) luminance LA of the neighboring (adjacent) area AA.

The display device 200 may include a display panel 210 and the optical sensor 280. The display panel 210 may include a plurality of pixels. The pixel may include a light-emitting element that emits light with a luminance corresponding to a driving current and a driving transistor that generates the driving current.

The optical sensor 280 may overlap the transmission area TA, and may include the light source. The optical sensor 280 may recognize an object (e.g., a user) by light emitted from the light source. The optical sensor 280 may be disposed under the display panel 210.

In an embodiment, the optical sensor 280 may include at least one of a face recognition sensor and a three-dimensional sensor. The face recognition sensor may recognize a face of a user. The three-dimensional sensor may recognize an object (e.g., a user) in three dimensions.

When the light source of the optical sensor 280 emits light, light emitted from the light source may be incident on a pixel disposed in the transmission area TA, and the driving current generated by the driving transistor of the pixel may increase. As illustrated in FIG. 5, although the drain-source voltage VDS of the driving transistor is the same, the driving current IDS generated by the driving transistor when the light source of the optical sensor 280 emits light may be greater than the driving current IDS generated by the driving transistor when the light source of the optical sensor 280 does not emit light.

When the light source of the optical sensor 280 emits light, a temperature of the pixel disposed in the transmission area TA may increase due to heat emitted from the light source, and thus, the driving current generated by the driving transistor of the pixel may increase. As illustrated in FIG. 6, the temperature of the pixel disposed in the transmission area TA may increase in response to the amount of light emitted from the light source of the optical sensor 280, and the driving current generated by the driving transistor when the light source of the optical sensor 280 emits light may be greater than the driving current generated by the driving transistor when the light source of the optical sensor 280 does not emit light.

When the driving current generated by the driving transistor of the pixel disposed in the transmission area TA increases, a luminance of a light emitted from the light-emitting element of the pixel disposed in the transmission area TA may increase, and accordingly, the transmission luminance of the transmission area TA may increase. Accordingly, the second transmission luminance LT2 of the transmission area TA when the light source of the optical sensor 280 emits light may be higher than the first transmission luminance LT1 of the transmission area TA when the light source of the optical sensor 280 does not emit light.

According to whether the light source of the optical sensor 280 emits light, a luminance deviation may occur between the first transmission luminance LT1 of the transmission area TA when the light source of the optical sensor 280 does not emit light and the second transmission luminance LT2 of the transmission area TA when the light source of the optical sensor 280 emits light. Accordingly, in order to compensate for the luminance of the transmission area TA according to whether the light source of the optical sensor 280 emits light, the optical compensation device 100 may determine the first transmission reference gamma voltages VRGMT1 for the transmission area TA by comparing the first transmission luminance LT1 of the transmission area TA with the neighboring (adjacent) luminance LA of the neighboring (adjacent) area AA, and may determine the second transmission reference gamma voltages VRGMT2 for the transmission area TA by comparing the second transmission luminance LT2 of the transmission area TA with the neighboring (adjacent) luminance LA of the neighboring (adjacent) area AA.

The gamma determiner 130 may determine the normal reference gamma voltages VRGMN for the normal area NA so that a difference between the normal luminance LN and a target luminance is within a reference range. The gamma determiner 130 may change the normal reference gamma voltages VRGMN when the difference between the normal luminance LN and the target luminance is not within the reference range. The gamma determiner 130 may store the normal reference gamma voltages VRGMN in a memory of the display device 200 when the difference between the normal luminance LN and the target luminance is within the reference range. Accordingly, optical compensation for the normal luminance LN that repeatedly compensates/corrects the optical characteristics (or gamma characteristics) for the normal luminance LN of the display device 200 may be performed.

The gamma determiner 130 may determine the first transmission reference gamma voltages VRGMT1 for the transmission area TA so that a difference between the first transmission luminance LT1 and the neighboring (adjacent) luminance LA is within a reference range. The gamma determiner 130 may change the first transmission reference gamma voltages VRGMT1 when the difference between the first transmission luminance LT1 and the neighboring (adjacent) luminance LA is not within the reference range. The gamma determiner 130 may store the first transmission reference gamma voltages VRGMT1 in the memory of the display device 200 when the difference between the first transmission luminance LT1 and the neighboring (adjacent) luminance LA is within the reference range. Accordingly, a first optical compensation for the transmission area TA that repeatedly compensates/corrects the optical characteristics (or gamma characteristics) for the transmission area TA of the display device 200 when the light source of the optical sensor 280 does not emit light may be performed.

The gamma determiner 130 may determine the second transmission reference gamma voltages VRGMT2 for the transmission area TA so that a difference between the second transmission luminance LT2 and the neighboring (adjacent) luminance LA is within a reference range. The gamma determiner 130 may change the second transmission reference gamma voltages VRGMT2 when the difference between the second transmission luminance LT2 and the neighboring (adjacent) luminance LA is not within the reference range. The gamma determiner 130 may store the second transmission reference gamma voltages VRGMT2 in the memory of the display device 200 when the difference between the second transmission luminance LT2 and the neighboring (adjacent) luminance LA is within the reference range. Accordingly, a second optical compensation for the transmission area TA that repeatedly compensates/corrects the optical characteristics (or gamma characteristics) for the transmission area TA of the display device 200 when the light source of the optical sensor 280 emits light may be performed.

In the illustrated embodiment, the first transmission reference gamma voltage VRGMT1 for the transmission area TA may be determined so that the difference between the first transmission luminance LT1 of the transmission area TA and the neighboring (adjacent) luminance LA of the neighboring (adjacent) area AA is within the reference range when the light source of the optical sensor 280 does not emit light, and the second transmission reference gamma voltage VRGMT2 for the transmission area TA may be determined so that the difference between the second transmission luminance LT2 of the transmission area TA and the neighboring (adjacent) luminance LA is within the reference range when the light source of the optical sensor 280 emits light, and thus, optical compensation for the transmission area TA may be accurately performed by considering whether the light source of the optical sensor 280 emits light. Accordingly, the contrast between the normal area NA and the transmission area TA may decrease, and the display quality of the display device 200 may be improved.

Figure 7:
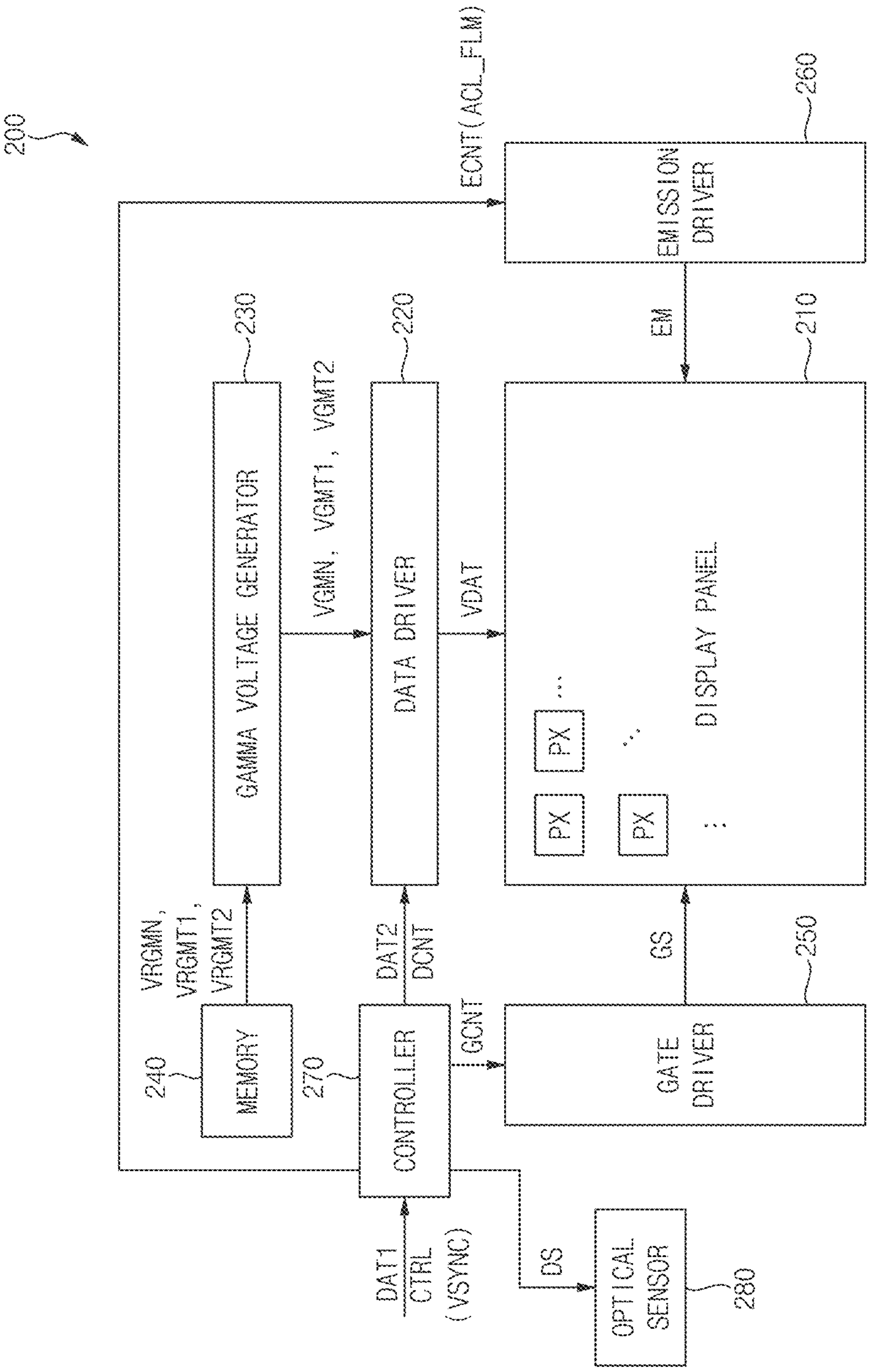
FIG. 7 is a block diagram showing a display device of FIG. 1.
Figure 8:
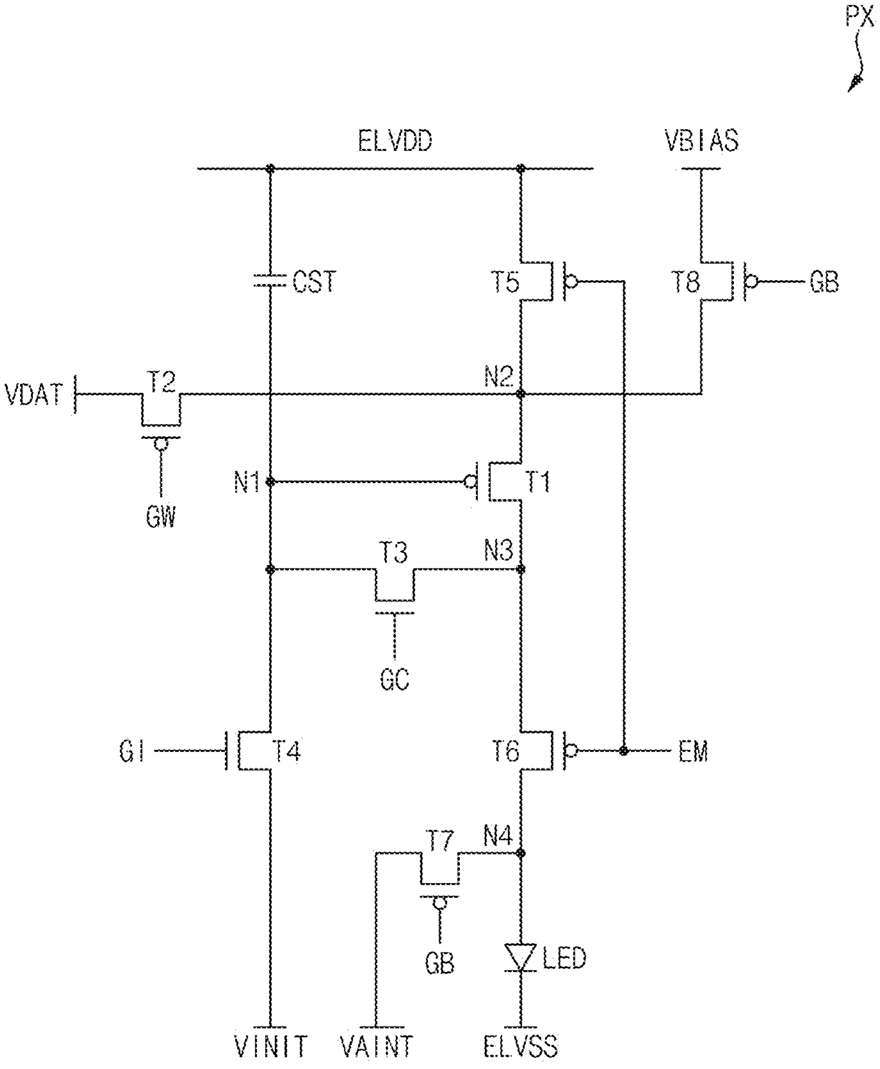
FIG. 8 is a circuit diagram showing a pixel of FIG. 7.
Figure 9:
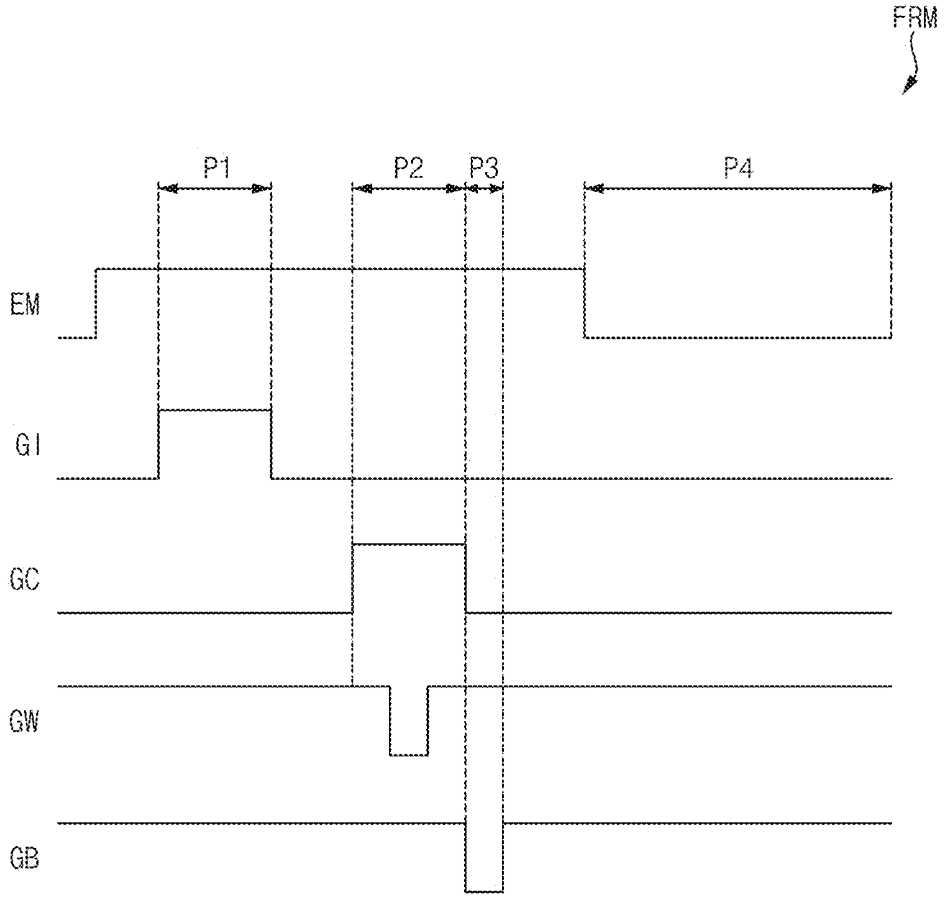
FIG. 9 is a timing diagram showing signals applied to the pixel of FIG. 8.
Figure 10:
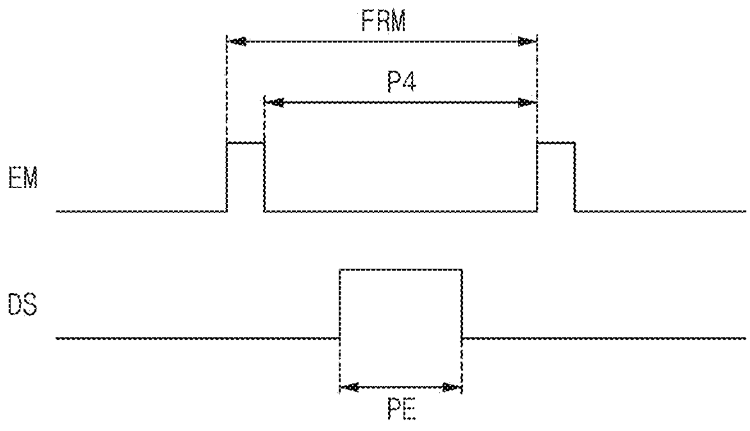
FIG. 10 is a timing diagram showing an emission signal and a driving signal of the optical sensor.
Figure 11:
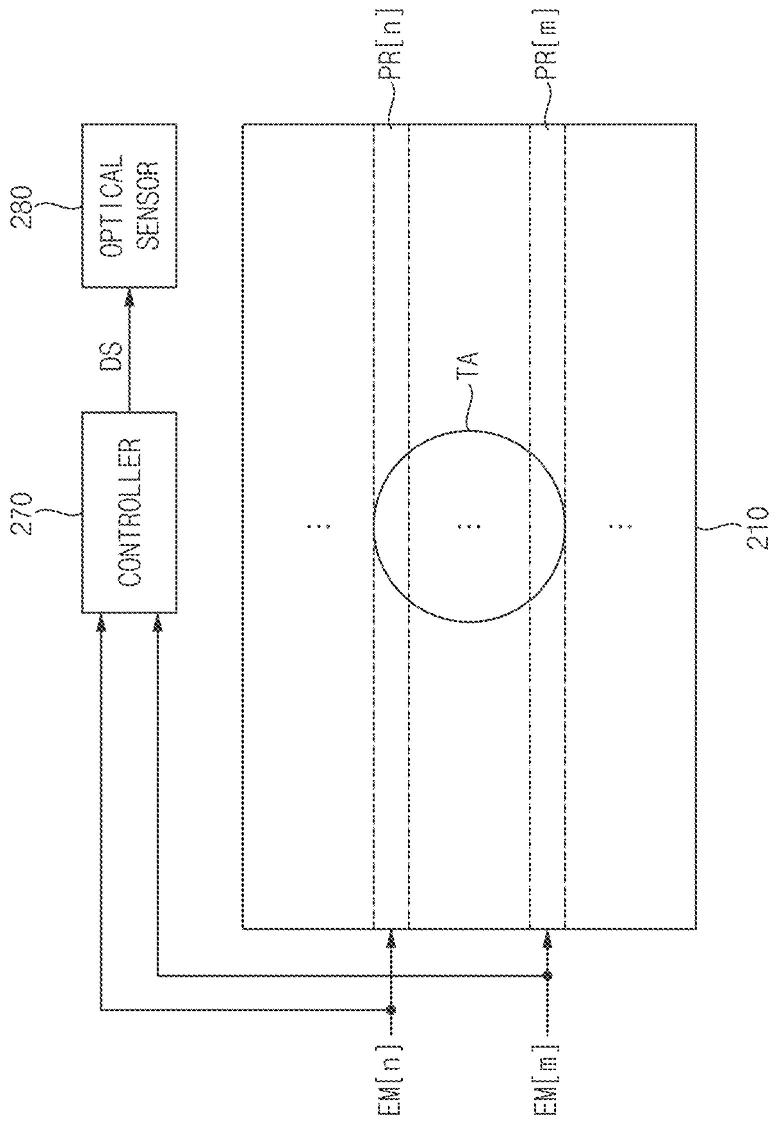
FIGS. 11 and 12 are views for describing synchronization between emission signals and the driving signal of the optical sensor.
Figure 12:
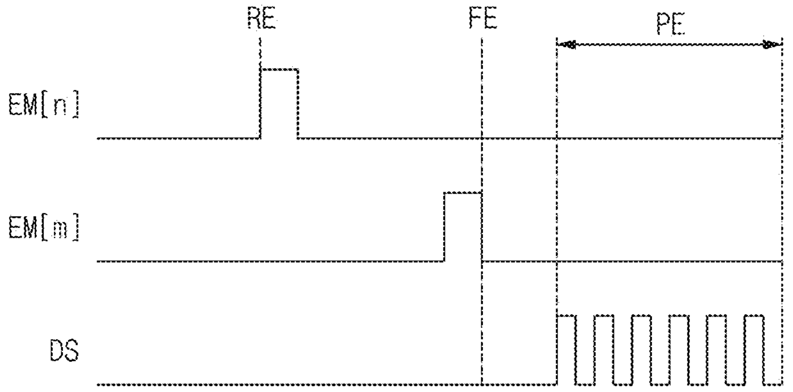

FIG. 7 is a block diagram showing the display device 200 of FIG. 1. FIG. 8 is a circuit diagram showing a pixel PX of FIG. 7. FIG. 9 is a timing diagram showing signals applied to the pixel PX of FIG. 8. FIG. 10 is a timing diagram showing an emission signal EM and a driving signal DS of the optical sensor 280. FIGS. 11 and 12 are views for describing synchronization between emission signals EM[n] and EM[m] and the driving signal DS of the optical sensor 280.

Referring to FIGS. 1 to 12, the display device 200 may include the display panel 210, a data driver 220, a gamma voltage generator 230, a memory 240, a gate driver 250, an emission driver 260, a controller 270, and the optical sensor 280.

The display panel 210 may include a plurality of pixels PX. A display area DA may be defined by the pixels PX.

The pixel PX may include a light-emitting element LED, a first transistor T1, a second transistor T2, a third transistor T3, a fourth transistor T4, a fifth transistor T5, a sixth transistor T6, a seventh transistor T7, an eighth transistor T8, and a storage capacitor CST.

The light-emitting element LED may emit light with a luminance corresponding to a driving current. The light-emitting element LED may include a first electrode (e.g., an anode) connected to a fourth node N4 and a second electrode (e.g., a cathode) receiving a second power voltage ELVSS.

The first transistor Tl may control the driving current flowing through the light-emitting element LED. The first transistor T1 may include a gate connected to a first node N1, a first electrode connected to a second node N2, and a second electrode connected to a third node N3. The first transistor T1 may be also referred to as a driving transistor.

The second transistor T2 may provide a data voltage VDAT to the first electrode of the first transistor T1 in response to a first gate signal GW. The second transistor T2 may include a gate receiving the first gate signal GW, a first electrode receiving the data voltage VDAT, and a second electrode connected to the second node N2. The second transistor T2 may be also referred to as a write transistor.

The third transistor T3 may compensate for a threshold voltage of the first transistor T1 in response to a second gate signal GC. The third transistor T3 may include a gate receiving the second gate signal GC, a first electrode connected to the third node N3, and a second electrode connected to the first node N1. The third transistor T3 may be also referred to as a compensation transistor.

The fourth transistor T4 may provide a first initialization voltage VINIT to the gate of the first transistor T1 in response to a third gate signal GI. The fourth transistor T4 may include a gate receiving the third gate signal GI, a first electrode receiving the first initialization voltage VINIT, and a second electrode connected to the first node N1. The fourth transistor T4 may be also referred to as an initialization transistor.

The fifth transistor T5 may block a connection between the first electrode of the first transistor T1 and the first power voltage ELVDD in response to an emission signal EM. The fifth transistor T5 may include a gate receiving the emission signal EM, a first electrode receiving the first power voltage ELVDD, and a second electrode connected to the second node N2. The fifth transistor T5 may be also referred to as a first emission transistor.

The sixth transistor T6 may block a connection between the second electrode of the first transistor T1 and the second power voltage ELVSS in response to the emission signal EM. The sixth transistor T6 may include a gate receiving the emission signal EM, a first electrode connected to the third node N3, and a second electrode connected to the fourth node N4. The sixth transistor T6 may be also referred to as a second emission transistor.

The seventh transistor T7 may provide a second initialization voltage VAINT to the first electrode of the light-emitting element LED in response to a fourth gate signal GB. The seventh transistor T7 may include a gate receiving the fourth gate signal GB, a first electrode receiving the second initialization voltage VAINT, and a second electrode connected to the fourth node N4. The seventh transistor T7 may be also referred to as a bypass transistor.

The eighth transistor T8 may provide a bias voltage VBIAS to the first electrode of the first transistor T1 in response to the fourth gate signal GB. The eighth transistor T8 may include a gate receiving the fourth gate signal GB, a first electrode receiving the bias voltage VBIAS, and a second electrode connected to the second node N2. The eighth transistor T8 may be also referred to as a bias transistor.

In an embodiment, each of the first transistor T1, the second transistor T2, the fifth transistor T5, the sixth transistor T6, the seventh transistor T7, and the eighth transistor T8 may be a P-type transistor (e.g., a p-channel metal-oxide-semiconductor ("PMOS") transistor), and each of the third transistor T3 and the fourth transistor T4 may be an N-type transistor (e.g., an n-channel metal-oxide-semiconductor ("NMOS") transistor). However, the disclosure is not limited thereto, and in another embodiment, at least one of the first transistor T1, the second transistor T2, the fifth transistor T5, the sixth transistor T6, the seventh transistor T7, and the eighth transistor T8 may be the N-type transistor, and at least one of the third transistor T3 and the fourth transistor T4 may be the P-type transistor.

The storage capacitor CST may store a signal of the gate of the first transistor T1. The storage capacitor CST may include a first electrode connected to the first node N1 and a second electrode receiving the first power voltage ELVDD.

In an initialization period P1 of a frame period FRM, the fourth transistor T4 may be turned on in response to a gate-on voltage (e.g., relatively high gate voltage) of the third gate signal GI, and the first initialization voltage VINIT may be applied to the gate of the first transistor T1. Accordingly, a channel of the first transistor T1 may be formed before the data voltage VDAT is applied to the gate of the first transistor T1.

In a compensation-writing period P2 of the frame period FRM, the third transistor T3 may be turned on in response to a gate-on voltage (e.g., relatively high gate voltage) of the second gate signal GC, and the first transistor T1 may be diode-connected. Further, the second transistor T2 may be turned on in response to a gate-on voltage (e.g., relatively low gate voltage) of the first gate signal GW, and the data voltage VDAT may be transmitted to the first electrode of the first transistor T1. Accordingly, the data voltage VDAT for which the threshold voltage of the first transistor Tl is compensated may be applied to the gate of the first transistor T1, and the storage capacitor CST may store the data voltage VDAT for which the threshold voltage of the first transistor T1 is compensated.

In a bypass period P3 of the frame period FRM, the seventh transistor T7 may be turned on in response to a gate-on voltage (e.g., relatively low gate voltage) of the fourth gate signal GB, and the second initialization voltage VAINT may be applied to the first electrode of the light-emitting element LED. Accordingly, charges stored in a parasitic capacitor of the light-emitting element LED may be discharged through the seventh transistor T7. Further, the eighth transistor T8 may be turned on in response to the gate-on voltage of the fourth gate signal GB, and the bias voltage VBIAS may be applied to the first electrode of the first transistor T1. Accordingly, the first transistor T1 may be on-biased, and hysteresis of the first transistor T1 may be controlled.

In an emission period P4 of the frame period FRM, the fifth and sixth transistors T5 and T6 may be turned on in response to a gate-on voltage (e.g., relatively low gate voltage) of the emission signal EM, and the driving current corresponding to the data voltage VDAT may flow through the light-emitting element LED. Accordingly, the light-emitting element LED may emit light with a luminance corresponding to the driving current.

The display panel 210 may include the normal area NA, the transmission area TA, and the normal area NA may include the neighboring (adjacent) area AA. The normal area NA may be an area of the display area DA of the display device 200 excluding the transmission area TA. The neighboring (adjacent) area AA may be neighboring the transmission area TA. The transmission area TA may be an area that displays an image and transmits external light. The normal area NA including the neighboring (adjacent) area AA may be an area that displays an image and does not transmit external light.

The data driver 220 may generate the data voltages VDAT based on second image data DAT2, a data control signal DCNT, normal gamma voltages VGMN, first transmission gamma voltages VGMT1, and second transmission gamma voltages VGMT2, and may provide the data voltages VDAT to the display panel 210. The second image data DAT2 may include grayscale values corresponding to the pixels PX. The data control signal DCNT may include a data clock signal, a horizontal start signal, a load signal, etc.

The data driver 220 may convert the second image data DAT2 for the normal area NA into the data voltages VDAT for the normal area NA based on the normal gamma voltages VGMN, and may provide the data voltages VDAT for the normal area NA to the normal area NA (the pixels PX disposed in the normal area NA).

The data driver 220 may convert the second image data DAT2 for the transmission area TA into the data voltages VDAT for the transmission area TA based on the first transmission gamma voltages VGMT1 when the optical sensor 280 does not emit light, and may provide the data voltages VDAT for the transmission area TA to the transmission area TA (the pixels PX disposed in the transmission area TA).

The data driver 220 may convert the second image data DAT2 for the transmission area TA into the data voltages VDAT for the transmission area TA based on the second transmission gamma voltages VGMT2 when the optical sensor 280 emits light, and may provide the data voltages VDAT for the transmission area TA to the transmission area TA (the pixels PX disposed in the transmission area TA).

The gamma voltage generator 230 may generate the normal gamma voltages VGMN based on the normal reference gamma voltages VRGMN, may generate the first transmission gamma voltages GMT1 based on the first transmission reference gamma voltages VRGMT1, and may generate the second transmission gamma voltages VGMT2 based on the second transmission reference gamma voltages VRGMT2. In an embodiment, the gamma voltage generator 230 may include a resistor string and gamma buffers that transmit the normal reference gamma voltages VRGMN, the first transmission reference gamma voltages VRGMT1, or the second transmission reference gamma voltages VRGMT2 to taps (or tap points) of the resistor string, for example. The gamma voltage generator 230 may divide the normal reference gamma voltages VRGMN applied to the taps using the resistor string to generate the normal gamma voltages VGMN for an entirety of grayscales, may divide the first transmission reference gamma voltages VRGMT1 applied to the taps using the resistor string to generate the first transmission gamma voltages VGMT1 for the entirety of the grayscales, and may divide the second transmission reference gamma voltages VRGMT2 applied to the taps using the resistor string to generate the second transmission gamma voltages VGMT2 for the entirety of the grayscales.

The memory 240 may store the normal reference gamma voltages VRGMN, the first transmission reference gamma voltages VRGMT1, and the second transmission reference gamma voltages VRGMT2. The normal reference gamma voltages VRGMN, the first transmission reference gamma voltages VRGMT1, and the second transmission reference gamma voltages VRGMT2 generated by the optical compensation device 100 may be stored in the memory 240 in the form of a lookup table. In an embodiment, the memory 240 may be implemented as a flash memory.

The gate driver 250 may generate a plurality of gate signals GS based on a gate control signal GCNT, and may apply the gate signals GS to a plurality of pixel rows of the display panel 210. The gate signals GS may include a plurality of first gate signals GW, a plurality of second gate signals GC, a plurality of third gate signals GI, and a plurality of fourth gate signals GB. The gate control signal GCNT may include a gate start signal, a gate clock signal, etc.

The emission driver 260 may generate a plurality of emission signals EM based on an emission control signal ECNT, and may apply the emission signals EM to the pixel rows of the display panel 210. The emission control signal ECNT may include an emission start signal ACL_FLM, an emission clock signal, etc.

The optical sensor 280 may include the light source, and the light source may emit light based on a driving signal DS. Light emitted from the light source may be incident on the transmission area TA of the display panel 210.

The controller 270 may control an operation of the data driver 220, an operation of the gate driver 250, an operation of the emission driver 260, and an operation of the optical sensor 280. The controller 270 may generate the second image data DAT2, the data control signal DCNT, the gate control signal GCNT, the emission control signal ECNT, and the driving signal DS based on first image data DAT1 and a control signal CTRL, may provide the second image data DAT2 and the data control signal DCNT to the data driver 230, may provide the gate control signal GCNT to the gate driver 250, may provide the emission control signal ECNT to the emission driver 260, and may provide the driving signal DS to the optical sensor 280. The first image data DATI may include grayscale values corresponding to the pixels PX. The control signal CTRL may include a vertical synchronization signal VSYNC, a horizontal synchronization signal, a global clock signal, a data enable signal, etc.

When the light source of the optical sensor 280 emits light while the luminance of the pixel PX disposed in the transmission area TA changes, the second transmission luminance LT2 of the transmission area TA measured by the optical compensation device 100 may not be uniform, and the second transmission reference gamma voltages VRGMT2 determined by the optical compensation device 100 may not be accurate.

Accordingly, in order to maintain the luminance of the pixel PX disposed in the transmission area TA constant when the light source of the optical sensor 280 emits light, as illustrated in FIG. 10, an emission period PE of the light source of the optical sensor 280 may be disposed within the emission period P4 of the pixel PX disposed in the transmission area TA. FIG. 10 may illustrate the emission signal EM applied to the pixel PX disposed in the transmission area TA and the driving signal DS applied to the optical sensor 280, and the emission period PE of the light source of the optical sensor 280 defined by a pulse of the driving signal DS may be disposed within the emission period P4 of the pixel PX disposed in the transmission area TA defined by the gate-on voltage of the emission signal EM applied to the pixel PX disposed in the transmission area TA.

In order that the emission period PE of the light source of the optical sensor 280 is disposed within the emission period P4 of the pixel PX disposed in the transmission area TA, the emission period PE of the light source of the optical sensor 280 may be synchronized with a driving signal of the display device 200. In an embodiment, the emission period PE of the light source of the optical sensor 280 may be synchronized with the vertical synchronization signal VSYNC. An interval from a starting point at which the vertical synchronization signal VSYNC has an activation level to a starting point of the emission period P4 of the pixel PX disposed in the transmission area TA may be constant. By controlling the driving signal DS in response to the vertical synchronization signal VSYNC, the emission period PE of the light source of the optical sensor 280 may be disposed within the emission period P4 of the pixel PX disposed in the transmission area TA.

In an embodiment, the emission period PE of the light source of the optical sensor 280 may be synchronized to the emission start signal ACL_FLM. The emission signals EM applied to the pixel rows may be generated by shifting the emission start signal ACL_FLM, and the emission signal EM applied to the pixel PX disposed in the transmission area TA may be generated by shifting the emission start signal ACL_FLM by a constant horizontal time. By controlling the driving signal DS in response to the emission start signal ACL_FLM, the emission period PE of the light source of the optical sensor 280 may be disposed within the emission period P4 of the pixel PX disposed in the transmission area TA.

In an embodiment, when the transmission area TA corresponds to an $n^{th}$ (n is a natural number greater than 1) pixel row PR[n] to an $m^{th}$ (m is a natural number greater than n) pixel row PR[m], the emission period PE of the light source of the optical sensor 280 may be synchronized with an $m^{th}$ emission signal EM[m] applied to the $m^{th}$ pixel row PR[m]. The $n^{th}$ pixel row PR[n] may be a first pixel row among the pixel rows overlapping the transmission area TA, and the $m^{th}$ pixel row PR[m] may be the last pixel row among the pixel rows overlapping the transmission area TA. As illustrated in FIG. 11, the controller 270 may receive an $n^{th}$ emission signal EM[n] applied to the $n^{th}$ pixel row PR[n] and the $m^{th}$ emission signal EM[m] applied to the $m^{th}$ pixel row PR[m], and may generate the driving signal DS based on the $n^{th}$ emission signal EM[n] and the $m^{th}$ emission signal EM[m].

In an embodiment, as illustrated in FIG. 12, the emission period PE of the light source of the optical sensor 280 may be disposed between a falling edge FE of the $m^{th}$ emission signal EM[m] and a rising edge RE of the $n^{th}$ emission signal EM[n]. Accordingly, the emission period PE of the light source of the optical sensor 280 may be disposed within each of the emission periods P4 of the pixels PX disposed in the transmission area TA.

Figure 13:
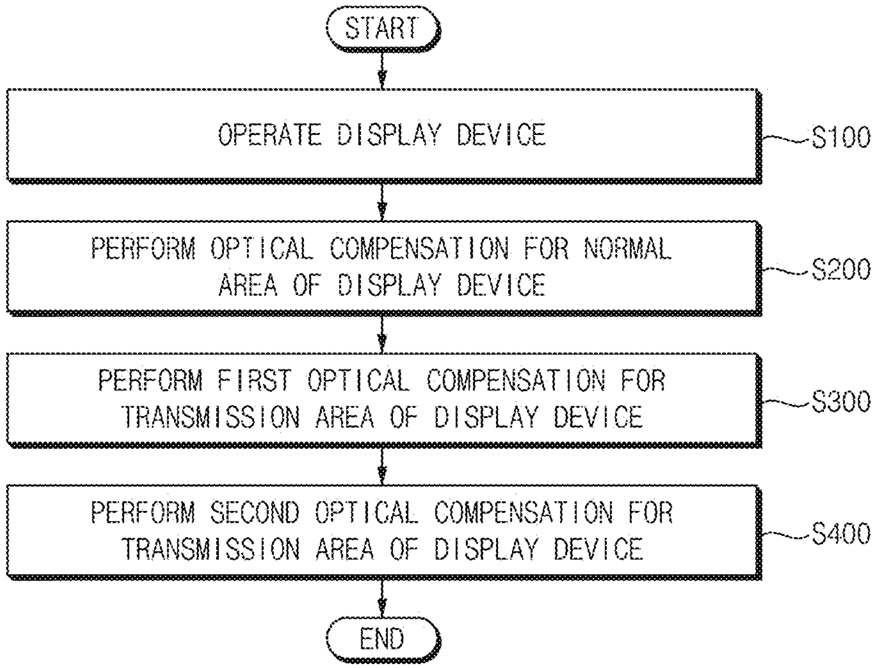
FIG. 13 is a flowchart showing an embodiment of a method of optically compensating a display device.
Figure 14:
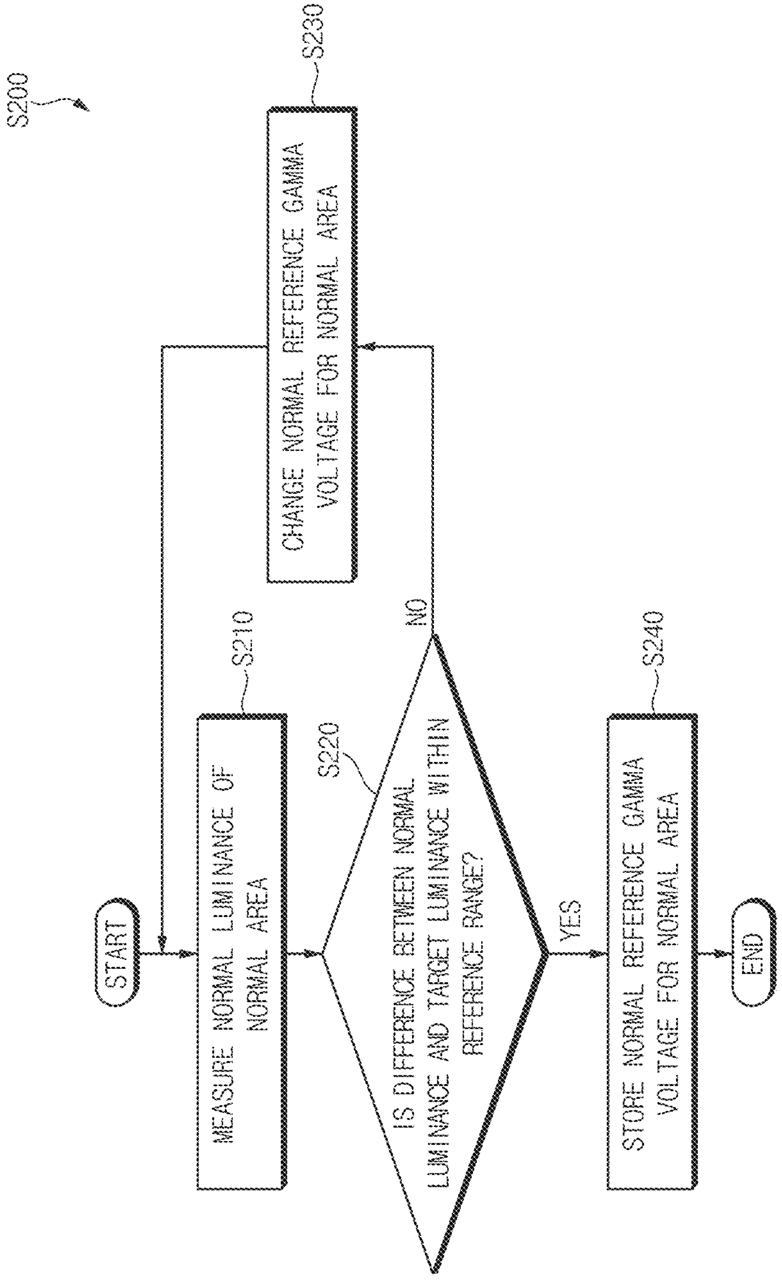
FIG. 14 is a flowchart showing performing an optical compensation for a normal area of FIG. 13.
Figure 15:
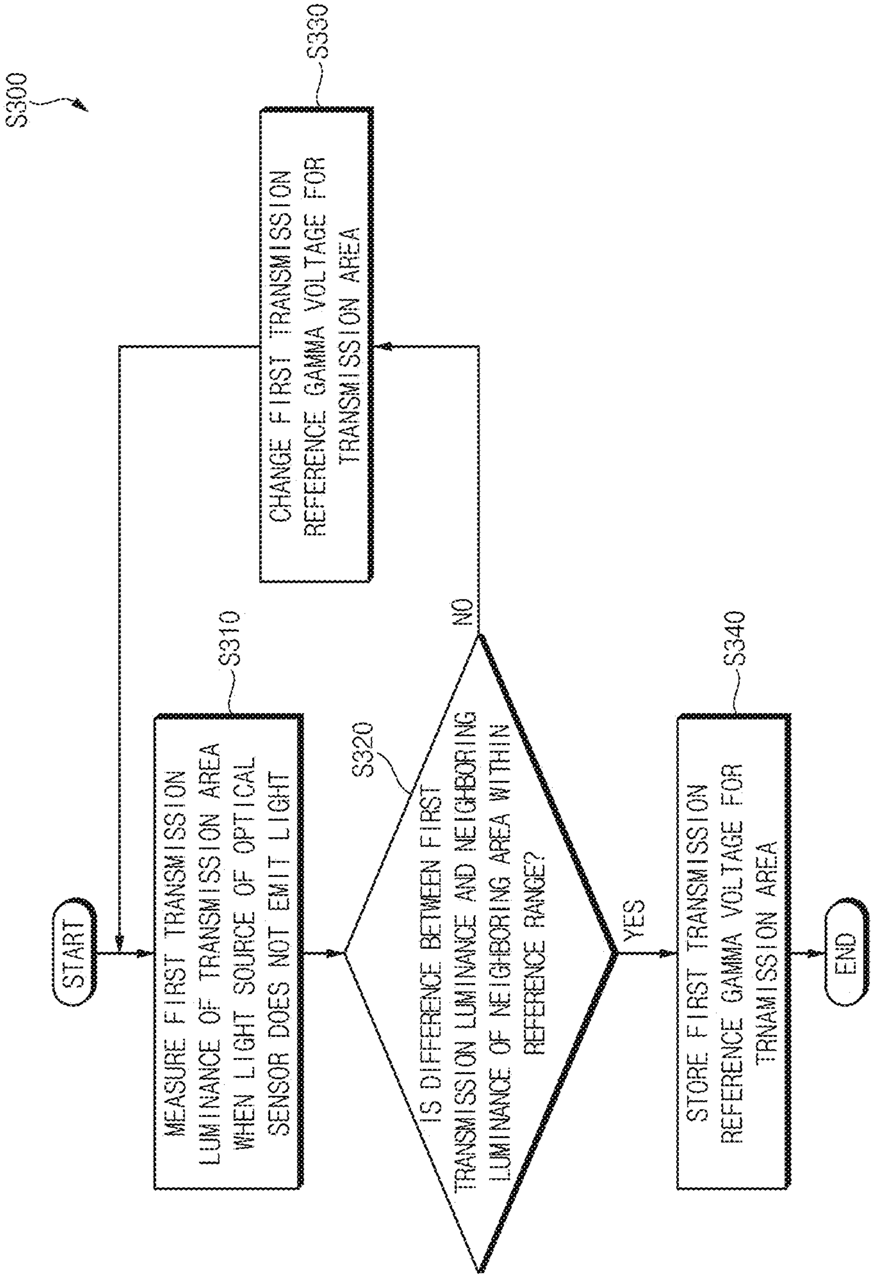
FIG. 15 is a flowchart showing performing a first optical compensation for a transmission area of FIG. 13.
Figure 16:
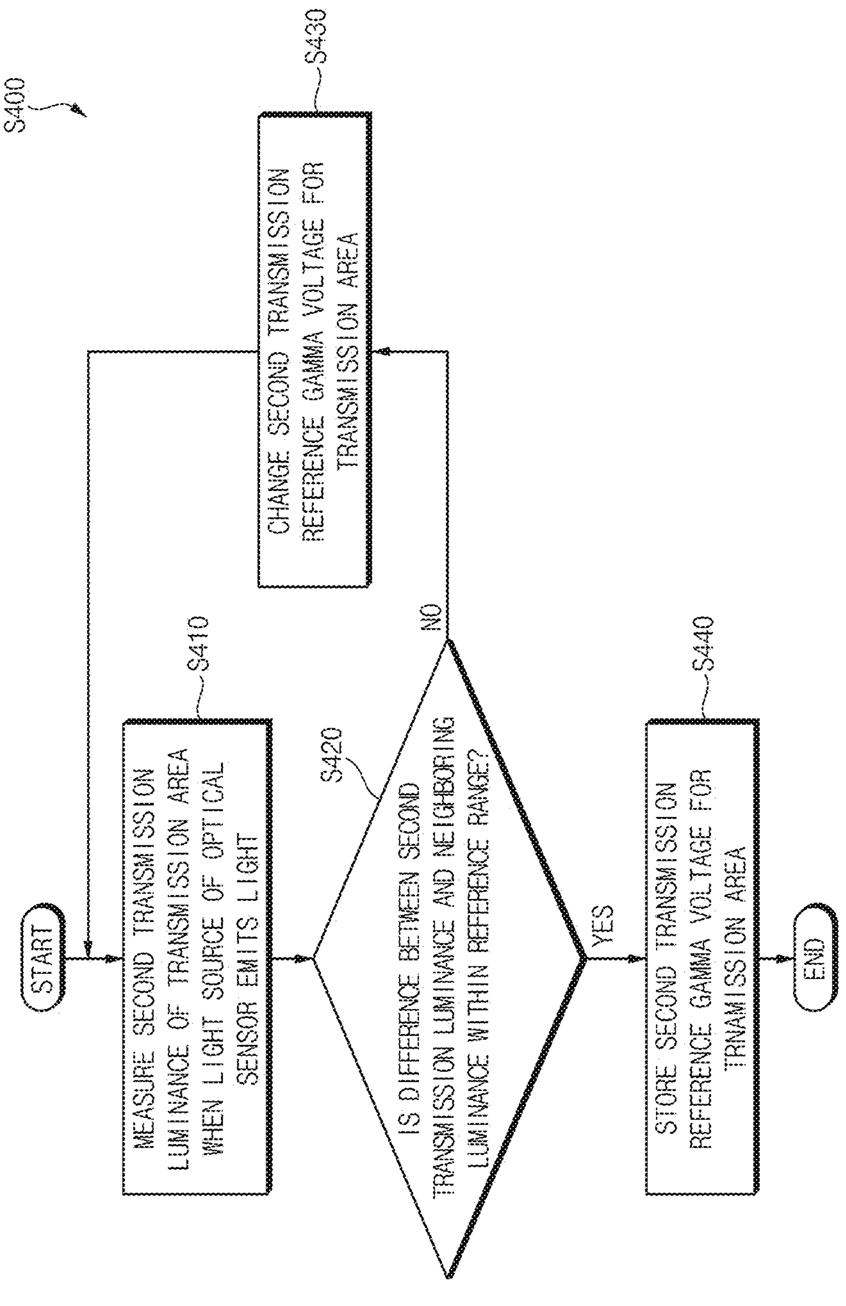
FIG. 16 is a flowchart showing performing a second optical compensation for the transmission area of FIG. 13.

FIG. 13 is a flowchart showing a method of optically compensating the display device 200. FIG. 14 is a flowchart showing performing an optical compensation for the normal area NA (S200) of FIG. 13. FIG. 15 is a flowchart showing performing a first optical compensation for the transmission area TA (S300) of FIG. 13. FIG. 16 is a flowchart showing performing a second optical compensation for the transmission area TA (S400) of FIG. 13.

Referring to FIGS. 1 to 16, in an optical compensation method of the display device 200 in an embodiment, the display device 200 may be operated (S100), optical compensation for the normal area NA of the display device 200 may be performed (S200), first optical compensation for the transmission area TA of the display device 200 may be performed (S300), and second optical compensation for the transmission area TA of the display device 200 may be performed (S400).

When operating the display device 200 (S100), the data voltages VDAT corresponding to the same grayscale may be provided to the normal area NA and the transmission area TA.

In performing the optical compensation for the normal area NA (S200), the normal luminance LN of the normal area NA may be measured (S210), and the normal reference gamma voltage VRGMN for the normal area NA may be determined so that the difference between the normal luminance LN and the target luminance is within the reference range. In determining the normal reference gamma voltage VRGMN for the normal area NA, the normal luminance LN and the target luminance may be compared (S220), the normal reference gamma voltage VRGMN for the normal area NA may be changed (S230) when the difference between the normal luminance LN and the target luminance is not within the reference range, and the normal reference gamma voltage VRGMN for the normal area NA may be stored (S240) in the memory 240 of the display device 200 when the difference between the normal luminance LN and the target luminance is within the reference range.

In performing the first optical compensation for the transmission area TA (S300), the first transmission luminance LT1 of the transmission area TA may be measured (S310) when the light source of the optical sensor 280 does not emit light, and the first transmission reference gamma voltage VRGMT1 for the transmission area TA may be determined so that the difference between the first transmission luminance LT1 and the neighboring (adjacent) luminance LA of the neighboring (adjacent) area AA is within the reference range. In determining the first transmission reference gamma voltage VRGMT1 for the transmission area TA, the first transmission luminance LT1 and the neighboring (adjacent) luminance LA may be compared (S320), the first transmission reference gamma voltage VRGMT1 for the transmission area TA may be changed (S330) when the difference between the first transmission luminance LT1 and the neighboring (adjacent) luminance LA is not within the reference range, and the first transmission reference gamma voltage VRGMT1 for the transmission area TA may be stored in the memory 240 of the display device 200 (S340) when the difference between the first transmission luminance LT1 and the neighboring (adjacent) luminance LA is within the reference range.

In performing the second optical compensation for the transmission area TA (S400), the second transmission luminance LT2 of the transmission area TA may be measured (S410) when the light source of the optical sensor 280 emits light, and the second transmission reference gamma voltage VRGMT2 for the transmission area TA may be determined so that the difference between the second transmission luminance LT2 and the neighboring (adjacent) luminance LA of the neighboring (adjacent) area AA is within the reference range. In determining the second transmission reference gamma voltage VRGMT2 for the transmission area TA, the second transmission luminance LT2 and the neighboring (adjacent) luminance LA may be compared (S420), the second transmission reference gamma voltage VRGMT2 for the transmission area TA may be changed (S430) when the difference between the second transmission luminance LT2 and the neighboring (adjacent) luminance LA is not within the reference range, and the second transmission reference gamma voltage VRGMT2 for the transmission area TA may be stored in the memory 240 of the display device 200 (S440) when the difference between the second transmission luminance LT2 and the neighboring (adjacent) luminance LA is within the reference range.

In an embodiment, the neighboring (adjacent) luminance LA of the neighboring (adjacent) area AA may be measured at a time of measuring the first transmission luminance LT1 (S310) or at a time of measuring the second transmission luminance LT2 (S410). Since the neighboring (adjacent) luminance LA is not affected by whether the light source of the optical sensor 280 emits light, the neighboring (adjacent) luminance LA when the light source of the optical sensor 280 emits light may be substantially equal to the neighboring (adjacent) luminance LA when the light source of the optical sensor 280 does not emit light. The neighboring (adjacent) luminance LA measured at one of the time of measuring the first transmission luminance LT1 (S310) and the time of measuring the second transmission luminance LT2 (S410) may be compared with the first and second transmission luminances LT1 and LT2 to perform the first and second optical compensations for the transmission area TA (S300 and S400).

In an embodiment, the neighboring (adjacent) luminance LA of the neighboring (adjacent) area AA may be measured at a time of measuring the first transmission luminance LT1 (S310) and at a time of measuring the second transmission luminance LT2 (S410). The neighboring (adjacent) luminance LA measured at the time of measuring the first transmission luminance LT1 (S310) may be compared with the first transmission luminance LT1 to perform the first optical compensation (S300) for the transmission area TA, and the neighboring (adjacent) luminance LA measured at the time of measuring the second transmission luminance LT2 (S410) may be compared with the second transmission luminance LT2 to perform the second optical compensation (S400) for the transmission area TA.

Figure 17:
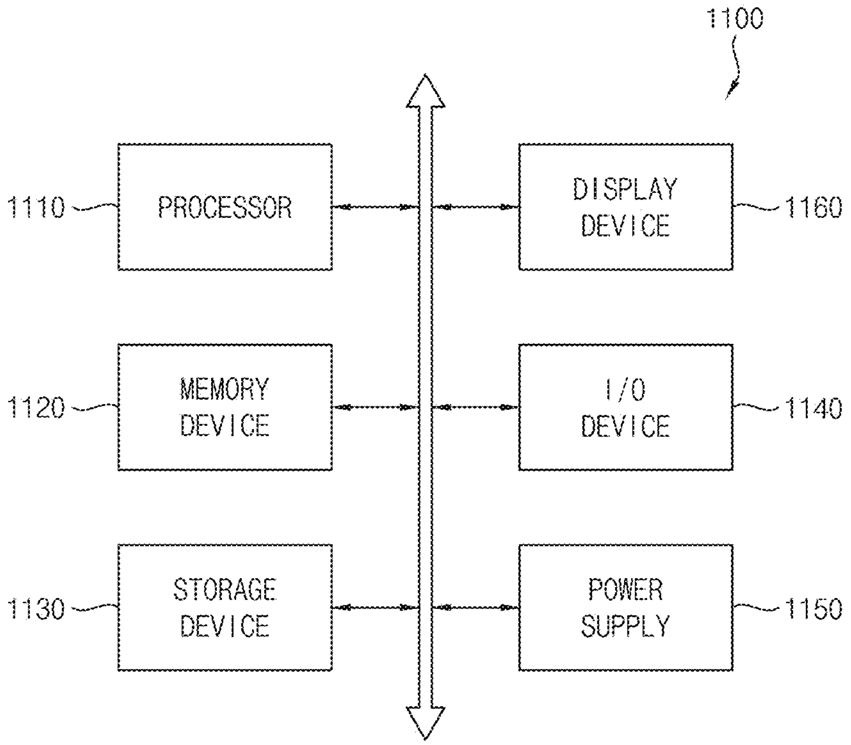
FIG. 17 is a block diagram showing an embodiment of an electronic apparatus.

FIG. 17 is a block diagram showing an embodiment of an electronic apparatus.

Referring to FIG. 17, an electronic apparatus 1100 may include a host processor 1110, a memory device 1120, a storage device 1130, an input/output ("I/O") device 1140, a power supply 1150, and a display device 1160. The electronic apparatus 1100 may further include a plurality of ports capable of communicating with a video card, a sound card, a memory card, a USB device, or the like, or communicating with other systems.

The host processor 1110 may perform predetermined calculations or tasks. In an embodiment, the host processor 1110 may be a microprocessor, a central processing unit ("CPU"), or the like. The host processor 1110 may be connected to other components through an address bus, a control bus, a data bus, or the like. In an embodiment, the host processor 1110 may also be connected to an expansion bus such as a peripheral component interconnect ("PCI") bus. In an embodiment, the host processor 1110 may provide the image data DAT1 of FIG. 7 and the control signal CTRL of FIG. 7 to the display device 1160.

The memory device 1120 may store data desired for an operation of the electronic apparatus 1100. In an embodiment, the memory device 1120 may include: a nonvolatile memory device such as an erasable programmable read-only memory ("EPROM"), an electrically erasable programmable read-only memory ("EEPROM"), a flash memory, a phase change random access memory ("PRAM"), a resistance random access memory ("RRAM"), a nano floating gate memory ("NFGM"), a polymer random access memory ("PoRAM"), a magnetic random access memory ("MRAM"), or a ferroelectric random access memory ("FRAM"); and/or a volatile memory device such as a dynamic random access memory ("DRAM"), a static random access memory ("SRAM"), or a mobile DRAM, for example.

The storage device 1130 may include a solid state drive ("SSD"), a hard disk drive ("HDD"), a compact disc read-only memory ("CD-ROM"), or the like. The I/O device 1140 may include: an input device such as a keyboard, a keypad, a touch pad, a touch screen, or a mouse; and an output device such as a speaker or a printer. The power supply 1150 may supply a power desired for the operation of the electronic apparatus 1100. The display device 1160 may be connected to other components through the buses or other communication links. The display device 1160 may correspond to the display device 100 of FIG. 1.

The optical compensation device, the display device, and the method of optically compensating the display device in the embodiments may be applied to a display device included in a computer, a notebook, a mobile phone, a smart phone, a smart pad, a smart watch, a portable media player ("PMP"), a personal digital assistance ("PDA"), a motion pictures expert group audio layer III ("MP3") player, or the like.

Although the optical compensation device, the display device, the method of optically compensating the display device, and the electronic apparatus in the embodiments have been described with reference to the drawings, the shown embodiments are examples, and may be modified and changed by a person having ordinary knowledge in the relevant technical field without departing from the technical spirit described in the following claims.

What is claimed is:

1. A display device comprising:

a display panel including a normal area which is a non-transmission area and a transmission area which transmits external light;

an optical sensor overlapping the transmission area and including a light source;

a gamma voltage generator which generates a first transmission gamma voltage based on a first transmission reference gamma voltage which affects a first transmission luminance of the transmission area when the light source does not emit light, and generates a second transmission gamma voltage based on a second transmission reference gamma voltage which affects a second transmission luminance of the transmission area when the light source emits light; and a data driver which converts image data for the transmission area into a data voltage for the transmission area based on the first transmission gamma voltage and the second transmission gamma voltage, and applies the data voltage for the transmission area to the transmission area, wherein the first transmission reference gamma voltage is stored in a state in which a difference between the first transmission luminance of the transmission area and a neighboring luminance of a neighboring area neighboring the transmission area is within a reference range, and the first transmission reference gamma voltage is changed in a state in which the difference between the first transmission luminance and the neighboring luminance is not within the reference range, and the second transmission reference gamma voltage is stored in a state in which a difference between the second transmission luminance of the transmission area and the neighboring luminance is within the reference range, and the second transmission reference gamma voltage is changed in a state in which the difference between the second transmission luminance and the neighboring luminance is not within the reference range.

2. The display device of claim 1, wherein an emission period of the light source is within an emission period of a pixel disposed in the transmission area.

3. The display device of claim 1, further comprising:

an emission driver which generates a plurality of emission signals applied to a plurality of pixel rows of the display panel based on an emission start signal; and a controller which receives a vertical synchronization signal, and generates the image data and the emission start signal.

4. The display device of claim 3, wherein an emission period of the light source is synchronized with the vertical synchronization signal.

5. The display device of claim 3, wherein an emission period of the light source is synchronized with the emission start signal.

6. The display device of claim 3, wherein, when the transmission area corresponds to an $n^{th}$ (n is a natural number greater than or equal to 1) pixel row to an $m^{th}$ (m is a natural number greater than n) pixel row, an emission period of the light source is synchronized with an $m^{th}$ emission signal applied to the $m^{th}$ pixel row.

7. The display device of claim 6, wherein the emission period of the light source is between a falling edge of the $m^{th}$ emission signal and a rising edge of an $n^{th}$ emission signal applied to the $n^{th}$ pixel row.

8. The display device of claim 1, wherein the data driver converts the image data for the transmission area into the data voltage for the transmission area based on the first transmission gamma voltage when the light source does not emit light, and converts the image data for the transmission area into the data voltage for the transmission area based on the second transmission gamma voltage when the light source emits light.

9. The display device of claim 1, wherein the gamma voltage generator generates a normal gamma voltage based on a normal reference gamma voltage for the normal area determined so that a difference between a normal luminance of the normal area and a target luminance is within the reference range, and wherein the data driver converts the image data for the normal area into the data voltage for the normal area based on the normal gamma voltage, and applies the data voltage for the normal area to the normal area.

10. The display device of claim 1, wherein the optical sensor includes at least one of a face recognition sensor and a three-dimensional sensor.

11. A method of optically compensating a display device, the method comprising:

measuring a first transmission luminance of a transmission area of the display device when a light source of an optical sensor, which overlaps the transmission area, does not emit light;

determining a first transmission reference gamma voltage which affects the first transmission luminance off the transmission area;

measuring a second transmission luminance of the transmission area when the light source emits light; and determining a second transmission reference gamma voltage which affects the second transmission luminance off the transmission area, wherein the transmission area transmits external light, and the determining the first transmission reference gamma voltage includes:

storing the first transmission reference gamma voltage in a state in which a difference between the first transmission luminance and a neighboring luminance of a neighboring area neighboring the transmission area is within a reference range, and changing the first transmission reference gamma voltage in a state in which the difference between the first transmission luminance and the neighboring luminance is not within the reference range, and the determining the second transmission reference gamma voltage includes:

storing the second transmission reference gamma voltage in a state in which a difference between the second transmission luminance and the neighboring luminance is within the reference range, and changing the second transmission reference gamma voltage in a state in which the difference between the second transmission luminance and the neighboring luminance is not within the reference range.

12. The method of claim 11, wherein measuring the first transmission luminance or measuring the second transmission luminance includes measuring the neighboring luminance.

13. The method of claim 11, further comprising:

measuring a normal luminance of a normal area of the display device which is a non-transmission area; and determining a normal reference gamma voltage for the normal area so that a difference between the normal luminance and a target luminance is within the reference range.

14. An electronic apparatus including a display device which displays an image and a host processor which provides image data to the display device, the display device comprising:

a display panel including a normal area which is a non-transmission area and a transmission area which transmits external light;

an optical sensor overlapping the transmission area and including a light source;

a gamma voltage generator which generates a first transmission gamma voltage based on a first transmission reference gamma voltage which affects a first transmission luminance of the transmission area determined when the light source does not emit light, and generates a second transmission gamma voltage based on a second transmission reference gamma voltage which affects a second transmission luminance off the transmission area when the light source emits light; and a data driver which converts the image data for the transmission area into a data voltage for the transmission area based on the first transmission gamma voltage and the second transmission gamma voltage, and applies the data voltage for the transmission area to the transmission area, wherein the first transmission reference gamma voltage is stored in a state in which a difference between the first transmission luminance of the transmission area and a neighboring luminance of a neighboring area neighboring the transmission area is within a reference range, and the first transmission reference gamma voltage is changed in a state in which the difference between the first transmission luminance and the neighboring luminance is not within the reference range, and the second transmission reference gamma voltage is stored in a state in which a difference between the second transmission luminance of the transmission area and the neighboring luminance is within the reference range, and the second transmission reference gamma voltage is changed in a state in which the difference between the second transmission luminance and the neighboring luminance is not within the reference range.

15. The electronic apparatus of claim 14, wherein an emission period of the light source is within an emission period of a pixel disposed in the transmission area.

16. The electronic apparatus of claim 14, wherein an emission period of the light source is synchronized with a driving signal of the display device.

17. The electronic apparatus of claim 16, wherein the emission period of the light source is synchronized with a vertical synchronization signal of the display device.

18. The electronic apparatus of claim 16, wherein the emission period of the light source is synchronized with an emission start signal of the display device.

19. The electronic apparatus of claim 16, wherein, when the transmission area corresponds to an $n^{th}$ pixel row (n is a natural number greater than or equal to 1) to an $m^{th}$ pixel row (m is a natural number greater than n), the emission period of the light source is synchronized with an $m^{th}$ emission signal applied to the $m^{th}$ pixel row.

20. The electronic apparatus of claim 19, wherein the emission period of the light source is between a falling edge of the $m^{th}$ emission signal and a rising edge of an $n^{th}$ emission signal applied to the $n^{th}$ pixel row.

21. The electronic apparatus of claim 14, wherein the optical sensor includes at least one of a face recognition sensor and a three-dimensional sensor.

* * * * *